United States Patent [19]

Petersen

[11] Patent Number: 5,607,001

[45] Date of Patent: Mar. 4, 1997

[54] SAFETY EQUIPMENT FOR A TANK HAVING A SYSTEM FOR COLLECTING THE GAS EXPELLED FROM THE TANK DURING LOADING

[75] Inventor: Anders I. D. Petersen, Lynge, Denmark

[73] Assignee: Emil Aarestrup Sørensen, London, United Kingdom

[21] Appl. No.: 500,684

[22] Filed: Jul. 11, 1995

[30] Foreign Application Priority Data

Aug. 4, 1994 [DK] Denmark ................... 0912/94

[51] Int. Cl.⁶ .................................................. B65B 31/00
[52] U.S. Cl. ..................... 141/59; 137/599.1; 251/149.2
[58] Field of Search .................................. 137/599, 599.1, 137/471, 458, 541; 251/149.2; 141/59, 95, 387

[56] References Cited

U.S. PATENT DOCUMENTS 5,060,688  10/1991  Sorensen .................... 137/471

*Primary Examiner*—David J. Walczak
*Assistant Examiner*—Timothy L. Maust
*Attorney, Agent, or Firm*—Watson, Cole, Stevens, Davis, P.L.L.C.

[57] ABSTRACT

In a safety equipment for a tank having a system for collecting the gas expelled from the tank during loading, a pressure relief valve is connected in parallel to the gas collecting system of the tank. The pressure relief valve is constructed with a front chamber. The front chamber communicates with the blow off outlet of the pressure relief valve and is closed by means of a rupture disc and is connected to the interior of the pressure relief valve through a by-pass. The rupture disc is designed to burst at the maximum permissible tank pressure, thereby to protect the tank against explosion in case loading of the tank is accidentally started before connection has been properly established from the gas collection system of the tank either back to the storage tank of the loading station or to an authorized system for otherwise disposing of the gas. Preferably, a vacuum relief valve is also connected in parallel to the gas collection system of the tank and is constructed with a front chamber arranged and connected in substantially the same manner as that of the pressure relief valve, but having a rupture disc designed to burst at the minimum permissible tank pressure, thereby to protect the tank against collapse in case a booster blower in the connection to the storage tank or other gas disposal system is accidentally started before or stopped after a pump for loading the tank.

6 Claims, 3 Drawing Sheets

5,607,001

SAFETY EQUIPMENT FOR A TANK HAVING A SYSTEM FOR COLLECTING THE GAS EXPELLED FROM THE TANK DURING LOADING

BACKGROUND OF THE INVENTION

The invention relates to safety equipment for a tank having a system for collecting the gas expelled from the tank during loading.

When a certain volumetric quantity of product per time unit, e.g. measured in $m^3/h$, is loaded into a tank, a volumetric quantity of gas is to be expelled from the tank per time unit corresponding to the volumetric quantity of product loaded per time unit with an addition, where applicable, for evaporation or other gas evolution from the liquid surface in the tank.

The traditional expedient for controlling this discharge of gas is a pressure relief valve mounted on the tank, through which the gas is blown off into the surrounding atmosphere.

However, attention is being paid to a still increasing extent to the fact that the gases blown off into the surrounding atmosphere may give rise to environmental pollution or may even be directly poisonous and harmful to the crew and other persons present in the area. At many loading stations it is therefore today a requirement that the gas expelled during loading should not be blown off into the surrounding atmosphere, but should be collected for returning to the loading station, where it may be fed back into the storage tank from which loading takes place, or may be conducted to a system for destruction, e.g. by incineration, or for liquefaction, regeneration or other processing, or in some cases to an atmospheric outlet fulfilling strict requirements of the authorities in respect of location and blow-off characteristics.

To be accepted for loading at a loading station having such gas disposal facilities, a tanker must have a gas collecting system having an outlet for connection to a gas receiving inlet of the loading station, e.g. by means of a hose. Said outlet and inlet must both be provided with a stop valve, which is to be opened before loading is commenced and to be closed when loading has been completed.

If however, by human error or negligence, it is forgotten to open either one or both of the stop valves before commencing loading, there is a danger that loading may be continued after the tank pressure has risen above the maximum permissible value for which the tank is designed. This may result in explosion of the tank.

SUMMARY OF THE INVENTION

It is an object of the invention to provide safety equipment suitable for preventing such a disaster.

With this object in view, the safety equipment according to the invention comprises a pressure relief valve which is connected in parallel to the gas collecting system and is constructed with a front chamber communicating with the flow-off outlet of the PR-valve, said front chamber being closed by means of a rupture disc and being connected to the interior of the PR-valve through a by-pass.

Further objects and features of the invention will be apparent to those skilled in the art from the following detailed description with reference to the accompanying drawings.

DETAILED DESCRIPTION OF THE PREFERRED EMBODIMENT

Figure 1:
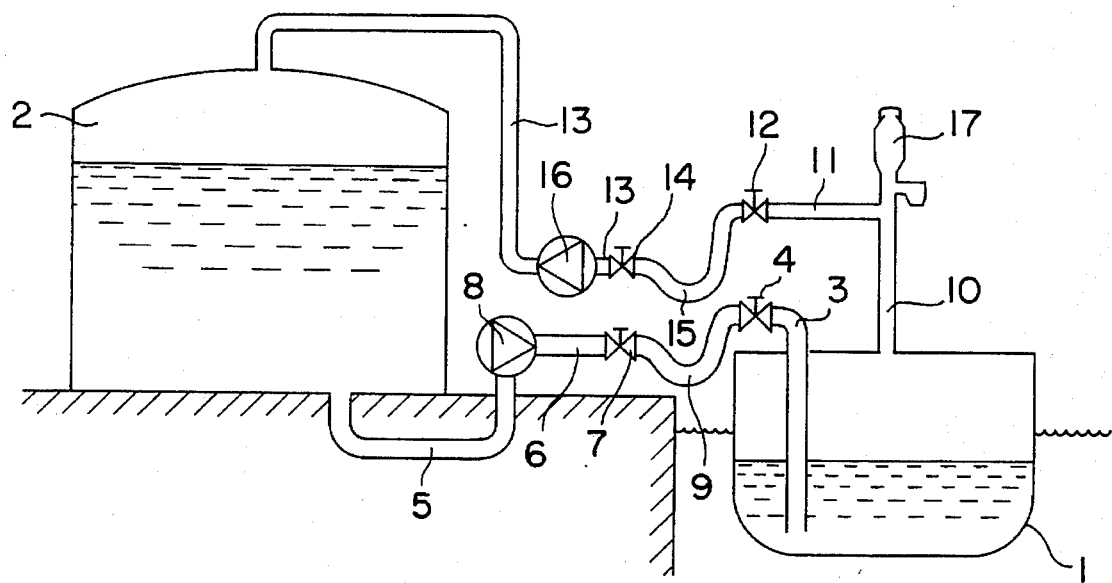
FIG. 1 is a schematic illustration of a tank of a cargo vessel in the process of being loaded from a storage tank of a loading station ashore.
Figure 2:
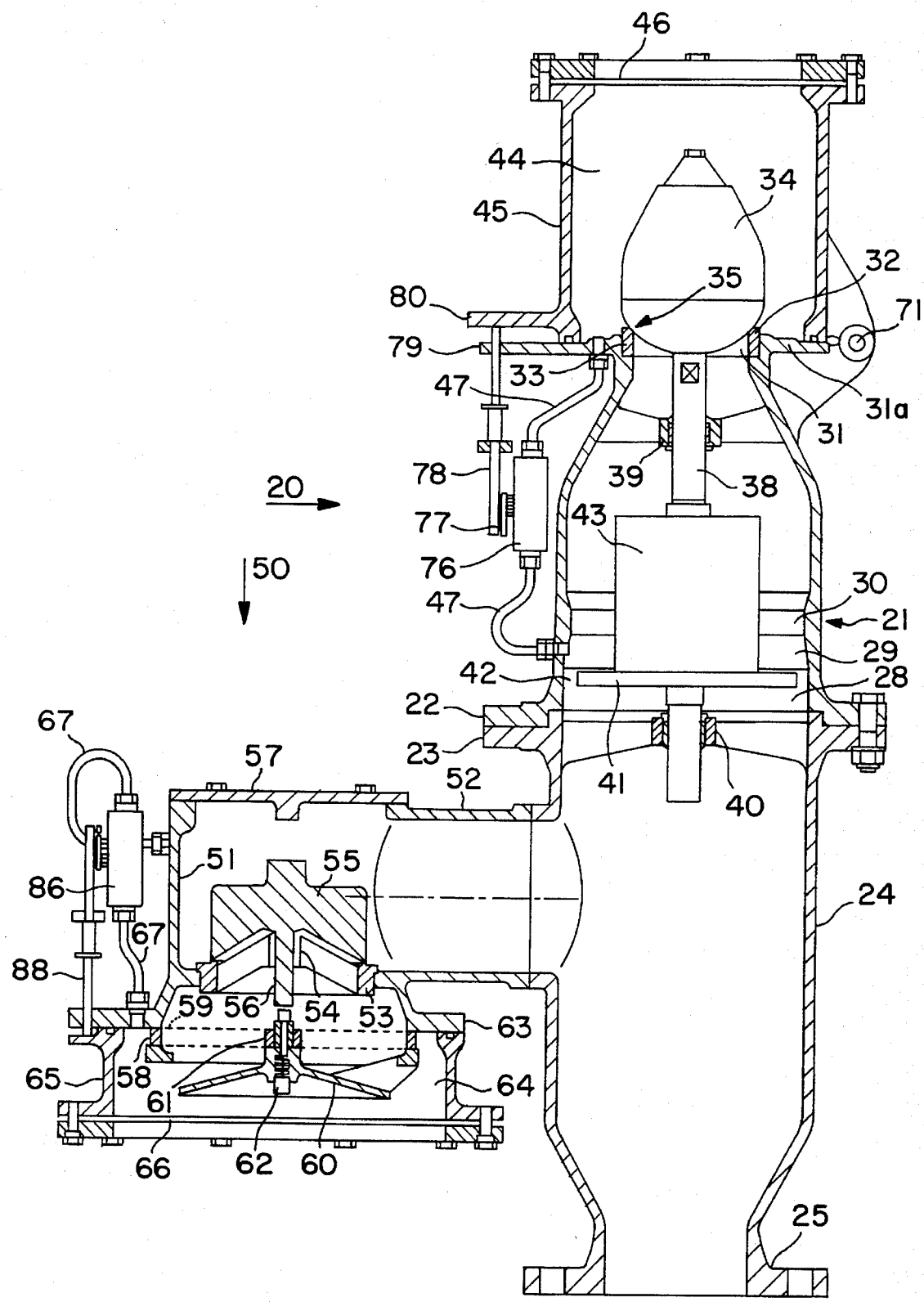
FIG. 2 is a vertical section through a security equipment according to an embodiment of the invention, comprising a pressure relief valve and a vacuum relief valve, each with a built-on front chamber.

In FIG. 1, 1 is a tank of a cargo vessel in the process of being loaded from a storage tank 2 of a loading station ashore.

The tank 1 has an inlet pipe 3, depending from the top of the tank almost to its bottom and provided above the top of the tank with a stop valve 4. The loading station has a loading pipe 5, 6 which extends from the bottom of the tank 2 to a stop valve 7 through a loading pump 8 above ground level. To commence loading the pipes 3 and 6 are connected with each other through a hose 9 at the valves 4 and 7, these valves are opened, and the pump 8 is started.

At its top the tank 1 has a stand pipe 10 from which a gas collection pipe 11 is branched off. The pipe 11 is provided with a stop valve 12. The loading station has a gas receiving pipe 13 extending from a receiving point at a stop valve 14 through a booster blower 16 to the top of the tank 2. The pipes 11 and 13 are connected with each other through a hose 15 at the valves 12 and 14.

Before loading is commenced, both valves 12 and 14 must be opened. If this is not done, the gas return system is obstructed, and there is a danger that the pressure in the tank 1 may rise above the maximum permissible pressure for which the tank is designed. This may result in a disastrous explosion of the tank.

Figure 3:
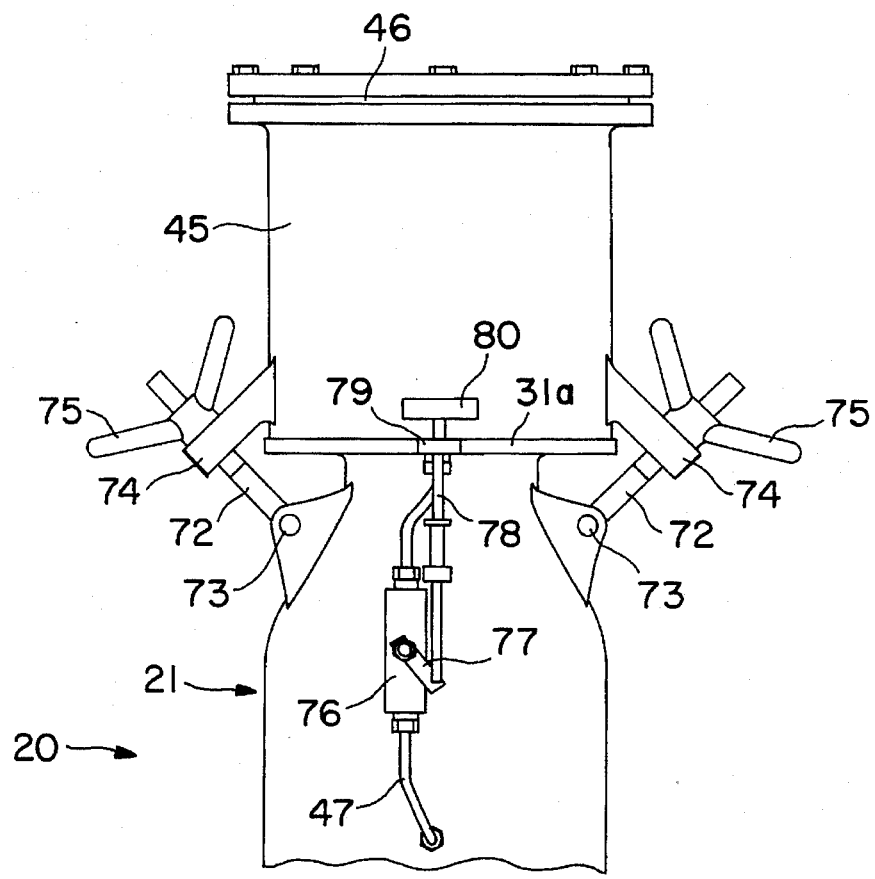
FIG. 3 is the pressure relief part of the equipment of FIG. 2, in side view from the left in FIG. 2.
Figure 4:
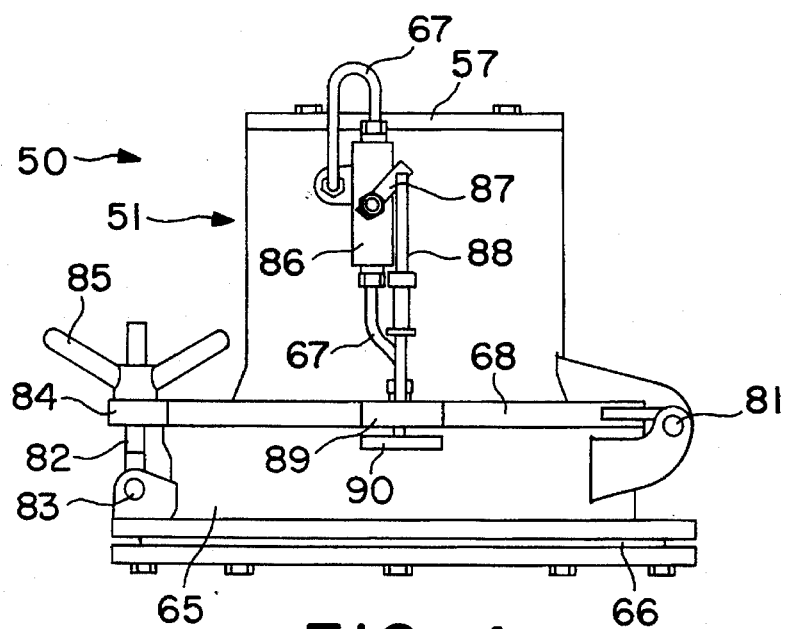
FIG. 4 is the vacuum relief part of the equipment of FIG. 2, in side view from the left in FIG. 2.

To eliminate the danger of explosion, safety equipment 17 according to the invention is mounted on the top of the stand pipe 10. This safety equipment will now be described with reference to FIGS. 3 and 4.

Arrow 20 designates a pressure relief valve of the general type disclosed in U.S. Pat. No. 5,060,688. It has a vertically oriented valve housing 21, which at its lower end has a flange 22 which is bolted to a flange 23 of a tubular socket 24 constructed at its lower end with a flange 25 that can be bolted to the upper end of the stand pipe 10.

At its lower end the valve housing has a cylindrical wall portion 28 which in a direction upwards is followed by a converging wall portion 29 and thereafter a cylindrical wall portion 30. At its top the valve housing is terminated by a blow-off opening 31 surrounded by a front flange 31a.

In the blow-off opening 31 there is mounted a mouth ring 32 at the inner side of which a conical valve seat 33 is formed. In the blow-off opening 31 there is arranged a drop-shaped body 34 on the underside of which a conical valve surface 35 is formed, which in the closed position of the valve sealingly engages the valve seat 33.

A stem 38 is connected to the drop-shaped body 34 and extends down through the housing where it is guided by an upper stem guide 39 in the valve housing and a lower stem guide 40 in the socket 24. The stem 38 carries a lifting disc 41 which in the closed position of the valve is located in the interior of the cylindrical wall portion 28 and has a slightly smaller diameter than the latter, so that a free passage slot 42 is formed around the lifting disc 41. The stem 38 carries a weighting load 43 which together with the weight of the drop-shaped body 34, the stem 38 and the lifting disc 41 exercise a closing force tending to keep the valve closed.

In front of the front flange 31a there is provided a front chamber 44 constituted by a hood 45 which is adapted to be clamped sealingly against the flange 31a by clamping means to be described later. At its front end the hood 45 is closed by means of a rupture disc 46 which is designed to burst when the pressure in the front chamber 44 rises above the maximum permissible pressure for which the tank 1 is designed.

Disregarding for the moment a by-pass, to be described later, the function of the valve would be as follows:

If an attempt is made at loading the tank 1 by means of the loading pump 8, while at least one of the valves 12 and 14 is in its closed position, the pressure in the tank 1, and thereby in the valve housing 21 will rise gradually, and when it rises above a closing pressure value corresponding to the closing force mentioned above, the valve body constituted by the drop-shaped body 34 will be lifted from its seat 33, thereby admitting gas to the front chamber 44. Since this is closed, the pressure in this chamber will rapidly rise to the same value as the tank pressure, with the result that the valve body (34) drops back to its closing position. Thereby, as the tank pressure continues to rise, the valve body 34 will repeatedly be opened and closed, with the result that the pressure in the front chamber will reach the maximum permissible tank pressure, only when the pressure in the valve housing, and thereby in the tank, has risen to the maximum permissible value plus the closing pressure value.

Thus, there would be an imminent danger of explosion of the tank.

Since this is directly contrary to the intention of the arrangement, the front chamber is connected to the interior of the valve through a by-pass conduit 47, whereby the pressure in the front chamber is constantly maintained on the same level as the tank pressure.

The rupture disc 46 is designed to burst at the maximum permissible tank pressure. If this occurs, it will be an urgent warning to everybody concerned that loading must immediately be stopped and may not be resumed until both valves 12 and 14 have been opened, and a new rupture disc 46 has been mounted.

At the moment of bursting of the rupture disc 46, the pressure in the front chamber 44 will immediately drop to atmospheric pressure, and the pressure relief valve will therefore be thrust open and admit gas blow-off in the same manner as a regular pressure relief valve, until loading has been stopped. If the pressure relief valve is of a type fulfilling international safety requirements, and stopping of the loading pump takes place expediently, the brief escape of gas through the pressure relief valve must be regarded as a minor mishap.

During the short critical period the by-pass 47 will also be open to the atmosphere, and it is therefore recommendable to construct the by-pass with a flame arrester preventing back-flash. The flame arrester need not be a separate constructional element, but may be formed by the by-pass itself by suitably dimensioning its passage through the front flange 31 of the valve housing 21.

If both valves 12 and 14 are opened with the intention of starting loading, but by mistake only the blower 16, and not the loading pump 8 is started, or if, on completion of loading, only the loading pump 8, but not the blower 16 is stopped, there is a danger that the tank 1 may be evacuated down to a pressure below the minimum permissible pressure for which the tank is designed. This may result in a disastrous collapse of the tank.

To eliminate this risk, the illustrated embodiment of the safety equipment also comprises a vacuum relief valve 50.

The vacuum valve 50 is of conventional construction. It has a valve housing 51 which at its right end is constructed with a connecting portion 52 connected to the socket 24.

The valve housing 51 has a bottom opening in which is mounted a valve seat 53 carrying a valve stem guide 54. The valve seat 53 is engaged by a valve body 55, which by means of a stem 56 is guided in the stem guide 54. The valve housing 51 is closed at its top by means of a cover 57.

At its bottom, the vacuum valve is in well-known manner constructed with a net ring 58 carrying a double flame arresting net 59, and with a shield 60 having a hub 61 accomodating a check-lifting button 62.

Around the bottom opening, the valve housing has a front flange 63, in front of which there is provided a front chamber 64 formed by a hood 65, which can be clamped sealingly against the front flange 63 by means to be described later, and which is closed at its front end by means of a rupture disc 66. The front chamber 64 is connected through a by-pass conduit 67 to the interior of the valve housing 51, whereby the pressure in the front chamber is maintained on the level of the tank pressure.

The rupture disc 66 is designed to burst at a pressure difference corresponding to the minimum permissible tank pressure.

If a situation occurs where the blower 16 is running, but the loading pump 8 is at rest, as previously described, the rupture disc 66 will consequently burst when the minimum permissible tank pressure has been reached, and this is an urgent warning that the blower 16 must be stopped, and that thereafter loading is not permitted until a new rupture disc has been mounted.

At the moment of bursting of the rupture disc 66 the pressure in the front chamber 64 will immediately rise to atmospheric pressure, and the valve will thereafter act as a regular vacuum relief valve securing the tank 1 against collapse.

Like the by-pass conduit 47 of the pressure relief valve, the by-pass conduit 67 of the vacuum relief valve should preferably be constructed with a flame arrester.

Turning now back to the pressure relief part of the device, the hood 45 is connected with the front flange 31 by means of a hinge 71 about which the hood 45 can be swung from the active position shown in the drawings to an inactive position beside the valve housing 21. In its active position the hood 45 can be clamped sealingly against the front flange 31a by means of bolts 72, which are pivotably connected to the valve housing 21 at 73 and can be swung into engagement with slotted lugs 74 on the hood 45, whereafter nuts 75 on the bolts 72 can be tightened against the lugs 74.

In the by-pass conduit 47 there is provided a valve 76 having an operating arm 77 which is coupled to a spring biased push rod 78 which extends through a lug 79 projecting radially from the front flange 31a and in the active position of the hood 45 engages a bracket 80 on the hood under the influence of the spring bias. In this position of the rod 78 the valve 76 is open.

When the hood 45 is released and swung to its inactive position, the push rod 78 is urged upwards by its spring bias and via the arm 77 turns the valve body of the valve 76 to its closing position.

The vacuum valve 50 has exactly corresponding elements: hinge 81, bolts 82, pivots 83, lugs 84, nuts 85, valve 86, valve arm 87, biased push rod 88, lug 89 and bracket 90.

Consequently, when the hood 65 is in its active position, the valve 86 in the by-pass conduit 67 is open, but when the hood 65 is released and swung to its inactive position, the valve 86 is closed.

It will thus be realized that when, upon completion of loading, the hoods 45 and 65 are removed from the front faces of the pressure and vacuum relief valves 20 and 50, these will function as normal pressure and vacuum relief valves and will serve as such during voyage of the cargo vessel to compensate for thermal pressure variations, and also during unloading, or during loading at stations not having facilities for handling collected gases.

While it is preferred to use a high velocity pressure relief valve, and more particularly one of the type illustrated and described or of similar type, it is to be understood that it is within the scope of the invention to use any pressure relief valve fulfilling international requirements.

Moreover, it is within the scope of the invention to use the safety equipment for cargo vessels having a recognized system of its own for handling gases collected during loading.

I claim:

1. Safety equipment for a tank having a system for collecting the gas expelled from the tank during loading, comprising a pressure relief valve which is adapted to be connected in parallel to the gas collecting system of the tank and is constructed with a front chamber communicating with the a blow off outlet of the pressure relief valve, the front chamber of the pressure relief valve being closed by means of a rupture disc and being connected to an interior of the pressure relief valve through a by-pass.

2. Safety equipment as in claim 1, in which the by-pass of the pressure relief valve is constructed with flame arresting means.

3. Safety equipment as in claim 1, in which the front chamber of the pressure relief valve comprises a hood which is clampable against a front face of the pressure relief valve, and removable therefrom, and the by-pass of the pressure relief valve is constructed with a stop valve, which is automatically opened in the clamped position of the hood and automatically closed upon removal of the hood from the front face of the pressure relief valve.

4. Safety equipment as in claim 1 and further comprising a vacuum relief valve which is connected in parallel to the gas collecting system of the tank and is constructed with a front chamber communicating with an inlet of the vacuum relief valve, said front chamber of the vacuum relief valve being closed by means of a rupture disc and being connected to an interior of the vacuum relief valve through a by-pass.

5. Safety equipment as in claim 4, in which the by-pass of the vacuum relief valve is constructed with flame arresting means.

6. Safety equipment as in claim 4, in which the front chamber of the vacuum relief valve comprises a hood which is clampable against a front face of the vacuum relief valve, and removable therefrom, and the by-pass of the vacuum relief valve is constructed with a stop valve, which is automatically opened in the clamped position of the hood and automatically closed upon removal of the hood from the front face of the vacuum relief valve.

* * * * *